F. M. BAKER.
HARVESTER REEL.
APPLICATION FILED MAY 29, 1912.
1,039,631.
Patented Sept. 24, 1912.
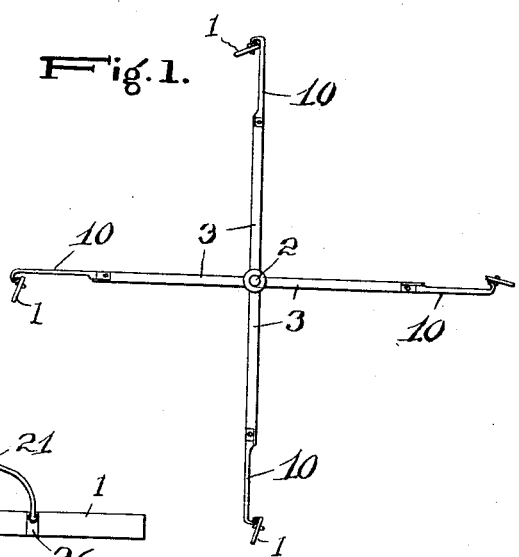
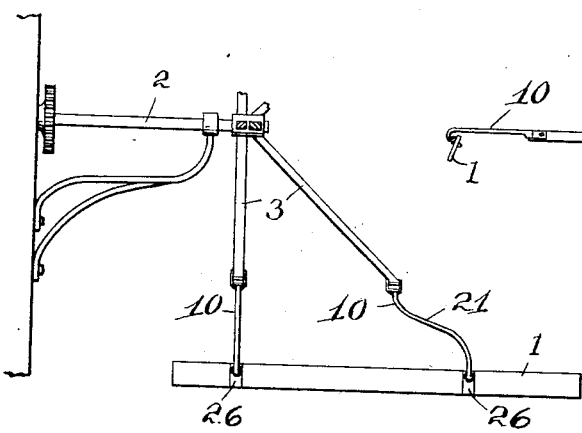
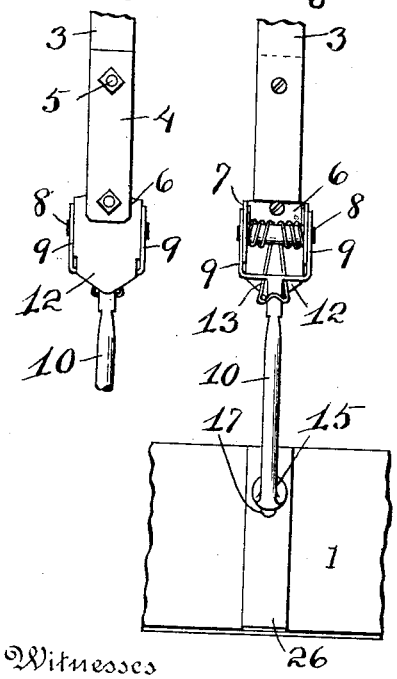
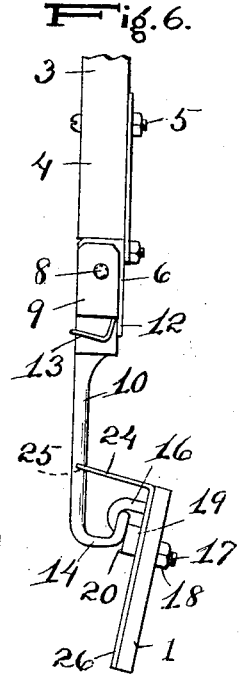
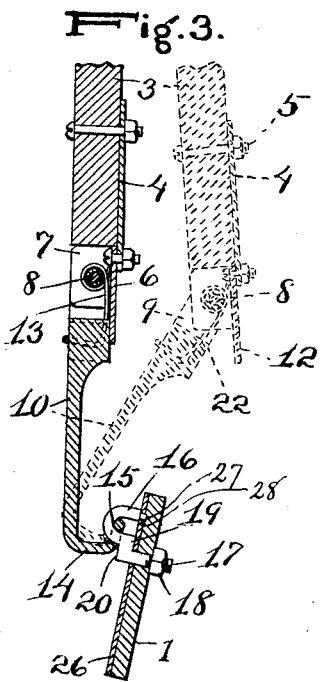
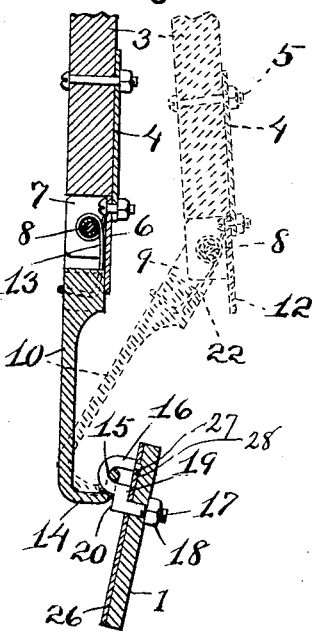
Witnesses
Stuart Hilder.
Francis M. Anderson.
Inventor
Francis M. Baker.
by
E. W. Anderson & Son.
his Attorneys

UNITED STATES PATENT OFFICE.

FRANCIS M. BAKER, OF VIROQUA, WISCONSIN.

HARVESTER-REEL.

1,039,631.  Specification of Letters Patent.  Patented Sept. 24, 1912.

Application filed May 29, 1912. Serial No. 700,437.

*To all whom it may concern:*

Be it known that I, FRANCIS M. BAKER, a citizen of the United States, resident of Viroqua, in the county of Vernon and State of Wisconsin, have made a certain new and useful Invention in Harvester-Reels, and declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is an end view of the invention as applied, with the reel bats loose and free to swing upon their pivots to drop into the grain. Fig. 2 is a side view of the same, partly in section. Fig. 3 is a longitudinal section of a reel arm, showing the hinge attachment, and the bat free to swing. Fig. 4 is a face view of a reel arm having the hinge attachment. Fig. 5 is a similar view from the opposite face. Fig. 6 is a side view of a reel arm showing the hinge attachment, and the bat fixed to prevent its swinging upon its pivot.

The object of the invention is to provide an improved harvester reel, whereby it is designed to save time and expense in repair and prevent waste of grain; and the invention consists in the novel construction and combinations of parts to this end, as hereinafter set forth.

In the ordinary reel the bats or slats are attached to the reel arms in a manner which, although strong enough, is not designed for operation in a very delicate manner, or in such way as would seem suitable in working among the heads of ripe grain.

In the accompanying drawings it is designed to illustrate my improvements, whereby the bat 1 is connected to the reel arm by a slender metallic extension or stem, which is secured to the reel arm by an attachment plate. These extensions are designed to be connected to the attachment plates by spring hinges, and to the bat by a link connection, whereby the bat is designed to have free movement of gravitation.

The numeral 2 indicates the reel shaft and 3 the ordinary arms extending therefrom.

4 is an attachment plate secured to the end of the arm at 5, and to the end of this plate which projects beyond the end of the arm is bolted the inner member 6 of a hinge plate, having lateral ears 7 to which are connected by a pivot bolt 8 the lateral branches 9 of the end of a slender extension or stem 10, which forms the outer member of the hinge and is several inches in length. The inner hinge member 6 is provided with a stop flange 12 which projects over and engages a bearing 22 of the branched end of the stem 10 when the extension is in the plane of the arm 3 of the reel. A spring 13 is provided in connection with the hinge, to hold the arm and extension in the same plane with sufficient rigidity to provide for efficient work on the grain. The hinge portion has a box-like form, closed in front by the hinge plate and its stop extension or flange and at the sides by the branches and ears, so that in its forward working motion it is closed and protected against the entry of matter which might clog the working, as it is designed that this spring shall yield in the case of some undue obstruction in the path of the bat, in order to avoid injuring the parts. The leverage of the extension forming the inner member of the hinge is designed to facilitate this action, and at the same time its slender character prevents undue contact with the grain. The ends of the bat extended beyond the reel arms are strengthened by the extensions, which in this position have an outward inclined portion 21, designed to provide for its connection to the bat at the extremity of the latter. These thin extension stems are designed to interfere as little as possible with the impact of the bat in its work.

The end of the extension is designed to be curved toward the front as indicated at 14, and the end of the curvature is flattened and perforated in eye form as at 15, to receive the hook end 16, of a short hook bolt 17, designed to pass through the upper portion of the bat, to which it is secured by a nut 18. The hook bolt is provided on its under side with a shoulder 19, to engage the surface of the bat, and in rear thereof with a shoulder 20 to engage the hook end of the extension stem 10. These shoulders are conveniently formed on the hook bolt as the opposite ends of a projection from its under side. When the hook bolts are tightened up on the bat their inner shoulders engage its rear surface and prevent the bolt from turning so as to throw the hooks out of position. The outer or rear shoulders of the bolts abut against the hooks when the bat has descended to working position. But while the reel arm is descending from vertical position into the grain the bat hangs freely from the hook ends in nearly vertical position, to enter the grain, and as the connection is of link character, play is provided for, to avoid somewhat a rigid impact. The reversal to horizontal position of the bat takes place automatically, through the action of gravity, when the reel arm reaches its highest point in its revolution, and this reversal is in the opposite direction to the bend of the hinge at the other end of the extension stem. The link-like connection of the bat with the end eyes of the slender extensions is designed to provide for a very free movement, which is not liable to be clogged, and as the attachments are all near the upper edge of the bat, its lower or main working surface is designed to be left smooth and free of projections, in order that it shall accomplish, without interference, its proper work in as delicate a manner as possible when the grain is fully ripe. In other conditions of the grain, the bat is held in rigid relation to the stem 10, by means of a removable angular notched brace 24, which is readily attached to the bat by means of the hook bolt, in position to engage the stem by the notch 25, in the end of its angular arm.

A perforated washer 26, is usually provided on the rear of the bar, between the same and the hook bolt, said bolt having an extension 27 at the end of its hook for engagement with a perforation or seat 28 of the washer, to keep the hook from turning and prevent undue wear.

Having described the invention, what I claim and desire to secure by Letters Patent is:

1. In a harvester reel, radial arms extending outward from the reel shaft, an attachment plate for the outer end of each arm, an inner hinge member carried by said plate and having a front guard portion and rearward turned lugs, a branched outer hinge member having a central stem extension, a hinge bolt connecting the branches of the outer member and said lugs, said inner member having a stop extension of its front guard portion engaging said stem, and a spring for normally maintaining the engagement of stop extension and stem to keep said stem and said plate attachment normally in alinement.

2. In a harvester reel, radial arms extending outward from the reel shaft, an attachment plate for the outer end of each arm, an inner hinge member carried by said plate and having a front guard portion and rearward turned lugs, a branched outer hinge member having a central stem, a hinge bolt connecting the branches of the outer member and said lugs, said inner member having a stop extension of its front guard portion engaging said stem, a spring for normally maintaining the engagement of stop extension and stem, a forward bent outer portion of said stem provided with a terminal eye, a reel bat, shouldered eye bolts carried by said bat and having each pivotal engagement with said eye, the shoulder of the eye bolt having stop engagement with said eye to limit the pivotal movement of the bat in one direction, and the edge of the bat having stop engagement with said stem to limit the movement of the bat in the opposite direction.

3. In a harvester reel, radial arms extending outward from the reel shaft, an attachment plate for the outer end of each arm, an inner hinge member carried by said plate and having a front guard portion and rearward turned lugs, a branched outer hinge member having a central stem, a hinge bolt connecting the branches of the outer member and said lugs, said inner member having a stop extension of its front guard portion engaging said stem, a spring for normally maintaining the engagement of stop extension and stem, a forward bent outer portion of said stem provided with a terminal eye, a reel bat, double shouldered eye bolts carried by said bat and having each normal pivotal engagement with said eye, an angle plate between one of the eye bolt shoulders and said bat, the other eye bolt shoulder having stop engagement with said eye, and the angle plate having engagement with said stem to maintain the bat in full acting position.

In testimony whereof I affix my signature in presence of two witnesses.

FRANCIS M. BAKER.

Witnesses:
  JOHN J. M. DAWSON,
  LUCY R. DAWSON.

Copies of this patent may be obtained for five cents each, by addressing the "Commissioner of Patents, Washington, D. C."